United States Patent [19]

Robb

[11] Patent Number: 4,911,538
[45] Date of Patent: Mar. 27, 1990

[54] LENS SYSTEM COMPRISING PLASTIC AND LIQUID LENS ELEMENTS WITH ASPHERICAL SURFACES

[75] Inventor: Paul N. Robb, Sunnyvale, Calif.

[73] Assignee: Lockheed Missiles & Space Company, Inc., Sunnyvale, Calif.

[21] Appl. No.: 381,421

[22] Filed: Jul. 18, 1989

Related U.S. Application Data

[63] Continuation-in-part of Ser. No. 379,386, Jul. 13, 1989.

[51] Int. Cl.⁴ ............................................. G02B 3/12
[52] U.S. Cl. .................................................. 350/418
[58] Field of Search ........................................ 350/418

[56] References Cited

FOREIGN PATENT DOCUMENTS

| 0000401 | 1/1985 | Japan ................................. 350/418 |
| 0490381 | 2/1937 | United Kingdom ................ 350/418 |
| 0611636 | 11/1948 | United Kingdom ................ 350/418 |

*Primary Examiner*—Bruce Y. Arnold
*Assistant Examiner*—Rebecca D. Gass
*Attorney, Agent, or Firm*—John J. Morrissey

[57] ABSTRACT

A lens triplet consisting of two identical aspherical acrylic lens elements and a liquid lens element is well-corrected for chromatic aberration and for spherochromatism, and is diffraction limited over the visible spectrum. The liquid lens element is made of an optical liquid selected because of its compatibility with acrylic for achieving paraxial color correction with negligible chromatic variation of spherical aberration. One surface of each acrylic lens element is aspherized to minimize spherical aberration.

12 Claims, 9 Drawing Sheets

FIG_1

FIG_2

FIG_3

FIG_4

FIG_8

FIG_9

FIG_11

FIG_12

FIG_13

FIG_14

4,911,538

LENS SYSTEM COMPRISING PLASTIC AND LIQUID LENS ELEMENTS WITH ASPHERICAL SURFACES

TECHNICAL FIELD

This invention relates generally to lens systems comprising plastic and liquid lens elements, and more particularly to a technique for optimizing performance of such lens systems by using aspherical lens surfaces.

The present patent application is a continuation-in-part of U.S. patent application Ser. No. 379,386 filed on July 13, 1989.

BACKGROUND OF THE INVENTION

In co-pending U.S. patent application Ser. No. 419,705 filed on Sept. 20, 1982, a technique was disclosed that enables an optical designer to select compatible optical materials for the refractive elements of an optical system that is to be color-corrected at a specified number of wavelengths. A technique disclosed in co-pending U.S. patent application Ser. No. 260,106 filed on Oct. 20, 1988 enables the designer of a lens system that is to be color-corrected at a specified number of wavelengths to include one or more liquid lens elements among the lens elements of the system.

In co-pending U.S. patent application Ser. No. 282,665 filed on Dec. 12, 1988, examples were disclosed of apochromatic lens triplets of a type in which a liquid lens element is contained between two geometrically identical glass lens elements facing in opposite direction. In co-pending U.S. patent application Ser. No. 345,793 filed on May 1, 1989, examples were disclosed of apochromatic lens systems of a type in which a number of identical glass lens elements and a liquid lens element are used to achieve high performance as indicated by a change in focus of less than one-quarter wavelength over the visible spectrum.

In co-pending U.S. patent application Ser. No. 379,386 filed on July 13, 1989, examples were disclosed of color-corrected lens systems of a type in which identical plastic lens elements and a liquid lens element, all of which have spherical surfaces, are used to achieve high performance. Surface sphericity is highly desirable for glass lens elements, because the process of grinding (or chemically etching) and polishing a glass lens surface to an aspherical configuration is generally very costly. However, since plastic lens elements can be formed by injection molding, it is relatively inexpensive to provide aspherical surfaces for plastic lens elements.

The aspherizing of lens surfaces is a well-known design expedient for improving performance of a lens system with respect to the monochromatic aberrations, particularly spherical aberration. However, for a lens system that is to be operated over a broad wavelength band (e.g., the visible spectrum), the aspherizing of a lens surface introduces chromatic variations of the monochromatic aberrations, especially chromatic variation of spherical aberration, which ordinarily causes a significant degradation in performance.

SUMMARY OF THE INVENTION

Each of the lens systems disclosed in the aforementioned U.S. patent application Ser. No. 379,386 is a triplet comprising a pair of identical acrylic lens elements and a liquid lens element. For each lens triplet, the particular optical liquid selected for the liquid lens element was selected because of its compatibility with acrylic for use in designing a lens system having substantially negligible variation of focal position and substantially negligible variation of spherical aberration as functions of wavelength.

It is a general object of the present invention to optimize the performance of a lens system comprising acrylic lens elements and a liquid lens element by: (1) first selecting an optical liquid for the liquid lens element that is compatible with acrylic so as to achieve paraxial color correction at a desired number of wavelengths while minimizing the chromatic variation of spherical aberration, and (2) then aspherizing a surface of each of the acrylic lens elements so as to optimize performance of the system.

It is a particular object of the present invention to optimize the performance of each of the lens triplets disclosed in co-pending U.S. patent application Ser. No. 379,386 by using aspherical surfaces for the acrylic lens elements thereof. The disclosure in U.S. patent application Ser. No. 379,386 is incorporated herein by reference.

DESCRIPTION OF THE DRAWING

FIG. 10 is a combined plot of the polychromatic modulation transfer function for on-axis rays calculated at the wavelengths indicated in FIG. 7 for the lens triplet of FIG. 6, and of the polychromatic modulation transfer function for on-axis rays calculated at the same wavelengths for an aberration-free optical system having the same aperture diameter and focal ratio as the lens triplet of FIG. 6.

BEST MODE OF CARRYING OUT THE INVENTION

Figures 1, 2:
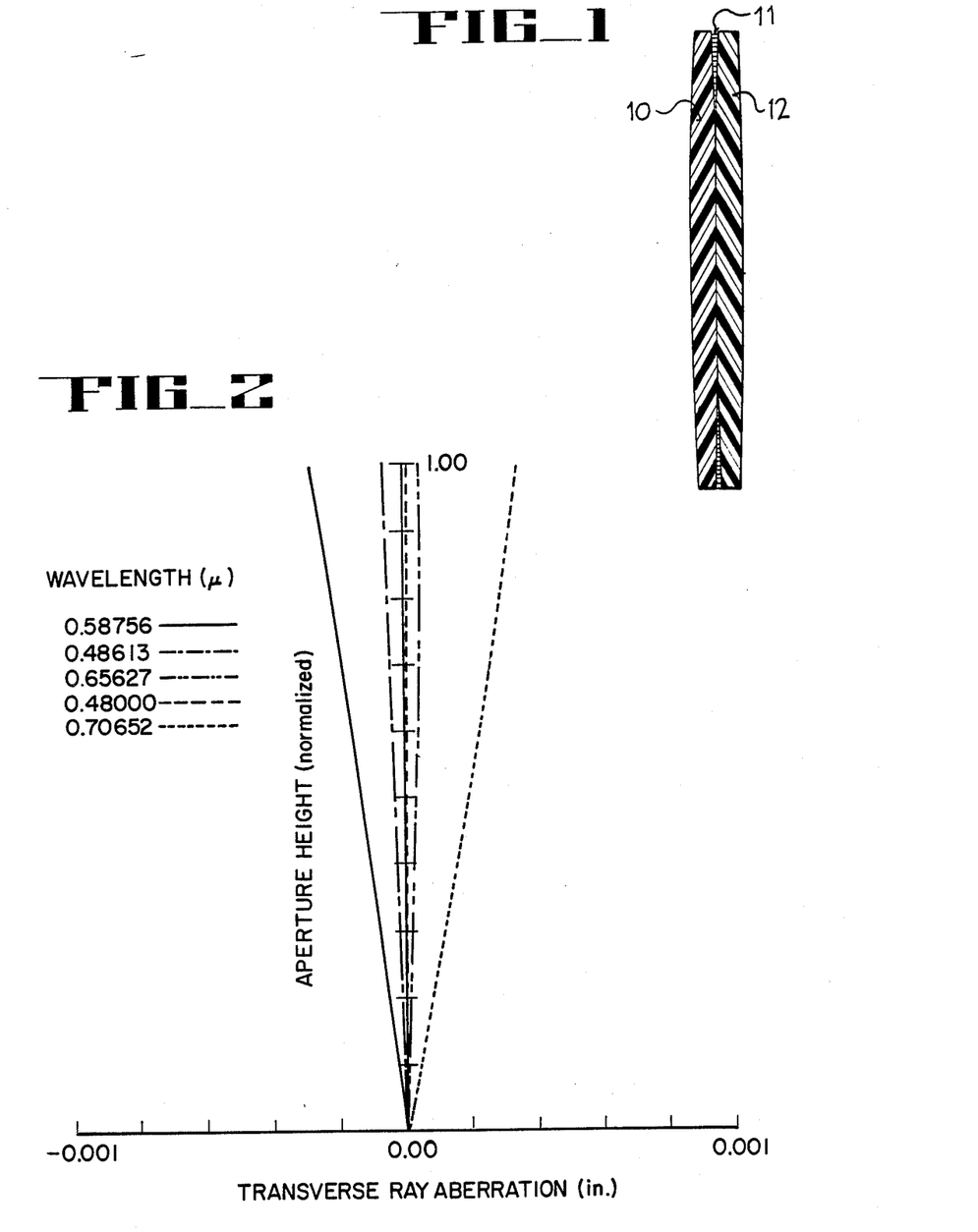
FIG. 1 is a profile drawing of a first embodiment of a lens triplet according to the present invention.
FIG. 2 is a plot of transverse ray aberration versus aperture height at five different wavelengths for the lens triplet of FIG. 1.

A first embodiment of a lens system according to the present invention, as illustrated in FIG. 1, is a triplet comprising an acrylic lens element 10, a liquid lens element 11, and an acrylic lens element 12, which are disposed coaxially with respect to each other along an optic axis, and which are secured in a mounting device appropriate for the particular application. The lens triplet illustrated in FIG. 1 can be used as, e.g., a photographic objective. A technique for containing the liquid lens element 11 between the acrylic lens elements 10 and 12 is disclosed in the aforementioned U.S. patent application Ser. No. 260,106.

The acrylic lens elements 10 and 12 are substantially identical to each other in chemical composition and in geometry. The liquid lens element 11 consists of a relatively inexpensive optical liquid marketed by R. L. Cargille Laboratories of Cedar Grove, N.J., and is contained between facing surfaces of the acrylic lens elements 10 and 12. The particular Cargille liquid used for the liquid lens element 11 is uniquely identified according to the U.S. Mil Spec system by the code number 710209. The designation "710209" specifies a liquid whose index of refraction at the wavelength of the sodium D spectral line (i.e., 0.5893 micron) has the value 1.710 to the third decimal place, and whose Abbe number has the value 20.9 to the first decimal place.

The lens triplet shown in FIG. 1 has an optical prescription specified in tabular format for a 10-inch focal length and an f/10 focal ratio as follows:

TABLE I

| Surface No. | Radius (inches) | Thickness (inches) | $N_d$ | $V_d$ | Material |
|---|---|---|---|---|---|
| 1 | 8.36233 | 0.06000 | 1.49176 | 57.46 | acrylic |
| 2 | −25.10491 | 0.00142 | 1.71035 | 20.95 | 710209 |
| 3 | 25.10491 | 0.06000 | 1.49176 | 57.46 | acrylic |
| 4 | −8.36233 | 9.96452 | | | |
| 5 | (image plane) | | | | | where the surfaces of the lens elements are numbered consecutively from left to right in accordance with optical design convention. Surface No. 2 is common to the acrylic lens element 10 and to the liquid lens element 11, and surface No. 3 is common to the liquid lens element 11 and to the acrylic lens element 12.

The "radius" listed in Table I for each surface is the radius of curvature of the surface (expressed in inches) at the optical axis. The radius of curvature of a surface is said to be positive if the center of curvature of the surface lies to the right of the surface, and negative if the center of curvature of the surface lies to the left of the surface. For the lens triplet shown in FIG. 1, the inwardly facing surfaces No. 2 and No. 3 are spherical. However, the outwardly facing surfaces No. 1 and No. 4 are aspherical. Specifically, the configuration of each of the outwardly facing surfaces No. 1 and No. 4 is hyperboloidal with a conic constant of approximately −2.47. The diameter of each lens element is one inch, and the aperture stop for the system is located at surface No. 1.

The "thickness" listed for a given surface in Table I is the thickness of the lens element bounded on the left by the given surface, where the thickness of each lens element is measured in inches along the optic axis of the system.

The column heading $N_d$ in Table I refers to the refractive index of the lens element bounded on the left by the indicated surface for the wavelength of the sodium d spectral line (i.e., for a base wavelength of 0.58756 micron). The column heading $V_d$ refers to the Abbe number for the lens element bounded on the left by the indicated surface at the same base wavelength. The "material" listed for each surface in Table I refers to the type of optical material from which the lens element bounded on the left by the indicated surface is made.

The Cargille liquid listed in Table I is identified by the code designation "710209", which uniquely specifies the particular liquid in terms of its index of refraction at the wavelength of the sodium D line. However, the values for refractive index listed in Table I for the Cargille 710209 liquid as well as for acrylic are the values at the wavelength of the sodium d line.

The shape of each of the hyperboloidal surfaces No. 1 and No. 4 is completely specified in terms of a local three-dimensional orthogonal (x,y,z) coordinate system by the equation:

$$z = C[\rho^2 + (k+1)z^2]/2; \qquad (1)$$

where the vertex of the surface (i.e., the intersection of the surface with the optic axis) is located at (0,0,0), and the z axis (i.e., the axis of revolution of the surface) coincides with the optic axis; where $$\rho^2 = x^2 + y^2; \qquad (2)$$

where C is the curvature of the surface at the vertex, as given by the equation:

$$C = 1/R, \qquad (3)$$

where R is the radius of curvature of the surface; and where k is the conic constant that determines the classification of the surface according to a schema tabulated as follows:

TABLE II

| Range or Value of k | Shape of Surface |
|---|---|
| k < −1 | Hyperboloid |
| k = −1 | Paraboloid |
| −1 < k < 0 | Ellipsoid of revolution about the major axis |
| k = 0 | Sphere |
| k > 0 | Ellipsoid of revolution about the minor axis |

Thus, the surfaces No. 1 and No. 4 of the lens triplet of FIG. 1 for which k = −2.47 are hyperboloidal about the optic axis of the lens triplet, and are specified by the equation:

$$z = C[\rho^2 + 2.161 \ z^2]/2. \qquad (4)$$

The refractive index of each of the optical materials from which the lens elements of the triplet of FIG. 1 are made varies with wavelength. To evaluate the performance of the lens triplet of FIG. 1 at a number of different wavelengths, five wavelengths within the visible region of the electromagnetic spectrum were selected at which the refractive indices of the optical materials have the following values:

TABLE III

| Material | Index of Refraction | | | | |
|---|---|---|---|---|---|
| | $N_1$ | $N_2$ | $N_3$ | $N_4$ | $N_5$ |
| acrylic | 1.49176 | 1.49776 | 1.48920 | 1.49826 | 1.48778 |
| 710209 | 1.71035 | 1.73486 | 1.70096 | 1.73703 | 1.69606 | where $N_1$ is the refractive index at the base wavelength of 0.58756 micron, and $N_2$, $N_3$, $N_4$ and $N_5$ are the refractive indices at specified wavelengths on either side of the base wavelength. Thus, $N_2$ is the refractive index at 0.48613 micron, $N_3$ is the refractive index at 0.65627 micron, $N_4$ is the refractive index at 0.48000 micron and $N_5$ is the refractive index at 0.70652 micron.

A graphical indication of performance of a lens system is provided by a plot of transverse ray aberration versus aperture height. Plots of transverse ray aberration versus aperture height are given in FIG. 2 for each of the five wavelengths indicated in Table III. From the shapes of the five plots shown in FIG. 2, it is apparent that spherical aberration is corrected, and that performance is limited by paraxial color correction.

The aspherizing of optical surfaces in a lens system to correct for spherical aberration inherently increases chromatic variation of spherical aberration. However, the lens elements 10, 11 and 12 of the lens triplet specified in Table I comprise materials (viz., acrylic and Cargille 710209 liquid) that are specially selected so that chromatic variation of spherical aberration is negligible. Consequently, since chromatic variation of spherical aberration is initially negligible, any increase in chromatic variation of spherical aberration due to aspherizing of the surfaces No. 1 and No. 4 is insignificant for practical purposes. Thus, the design form specified in Table I provides an optimal correction for spherical aberration without introducing any significant chromatic variation of spherical aberration.

The back focal distance of a lens system for a particular wavelength is defined as the distance along the optic axis of the system between the focal surface for that particular wavelength and the lens surface closest to that focal surface. The back focal distance for those wavelengths at which color correction has been achieved (i.e., for those wavelengths at which paraxial marginal rays passing through the system are brought to a common focus at the focal surface) can be considered as a "baseline" back focal distance for the system. The change in back focal distance from the "baseline" back focal distance as a function of wavelength provides an indication of the variation of axial chromatic aberration with respect to wavelength for the system.

Figure 3:
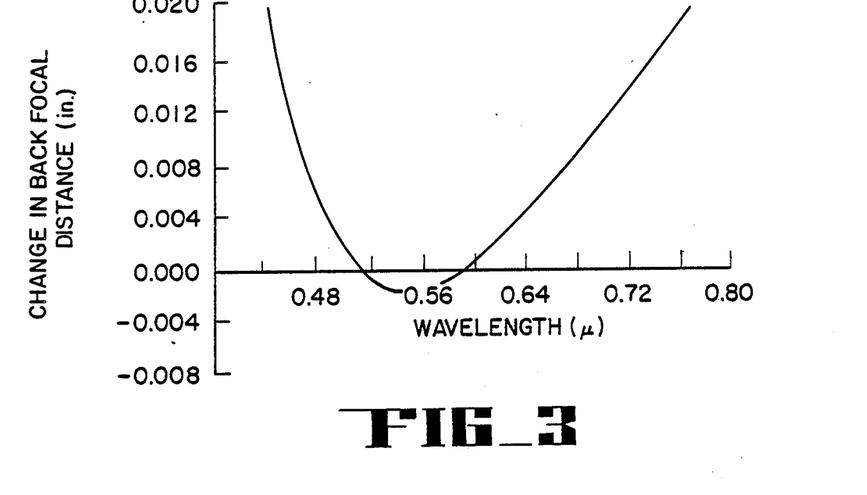
FIG. 3 is a plot of change in back focal distance versus wavelength for the lens triplet of FIG. 1.

FIG. 3 is a plot of change in back focal distance versus wavelength at the focal plane of the lens triplet illustrated in FIG. 1. The curve plotted in FIG. 3 indicates the chromatic variation in focal position along the optic axis of the lens triplet illustrated in FIG. 1, and provides a measure of the axial chromatic aberration of the lens triplet. The two crossings of the horizontal axis by the curve plotted in FIG. 3 indicate that the lens triplet illustrated in FIG. 1 is color-corrected at two wavelengths, and is therefore an achromat.

Figure 4:
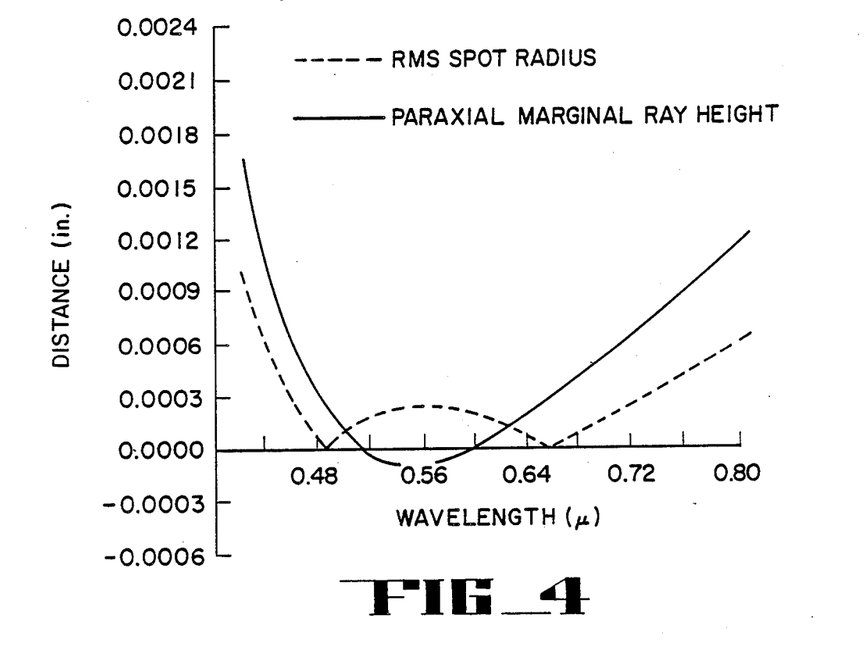
FIG. 4 is a combined plot of paraxial marginal ray height versus wavelength and root-mean-square (rms) spot radius versus wavelength for the lens triplet of FIG. 1.

In FIG. 4, paraxial marginal ray height and root-mean-square (rms) spot radius are plotted as functions of wavelength for the lens triplet of FIG. 1. The variation of paraxial marginal ray height with respect to wavelength on the image plane provides an indication of the extent to which the system is corrected for axial chromatic aberration. The curve for paraxial marginal ray height versus wavelength shown in FIG. 4 crosses the horizontal axis at two places, and thus corroborates the showing in FIG. 3 that the lens triplet of FIG. 1 is an achromat.

Because of the electromagnetic nature of optical radiation, the performance of an optical system is affected not only by geometrical aberrations (i.e., the monochromatic aberrations, chromatic aberration, and chromatic variations of the monochromatic aberrations) but also by diffraction. In a lens system, diffraction reduces the contrast of a sinusoidal input signal by an amount that varies with the spatial frequency of the input signal. In general, according to the principles of systems engineering, the performance of a system can be indicated by the ratio of the amplitude of the output to the amplitude of the input. This ratio is conventionally expressed as a plot of response versus frequency. In analyzing the performance of a lens system, the "polychromatic modulation transfer function" is defined as the ratio of the modulation of the input signal to the modulation of the output signal. This ratio, plotted as a function of the spatial frequency (measured in lines per millimeter) of the input signal, indicates the performance of the lens system.

Figure 5:
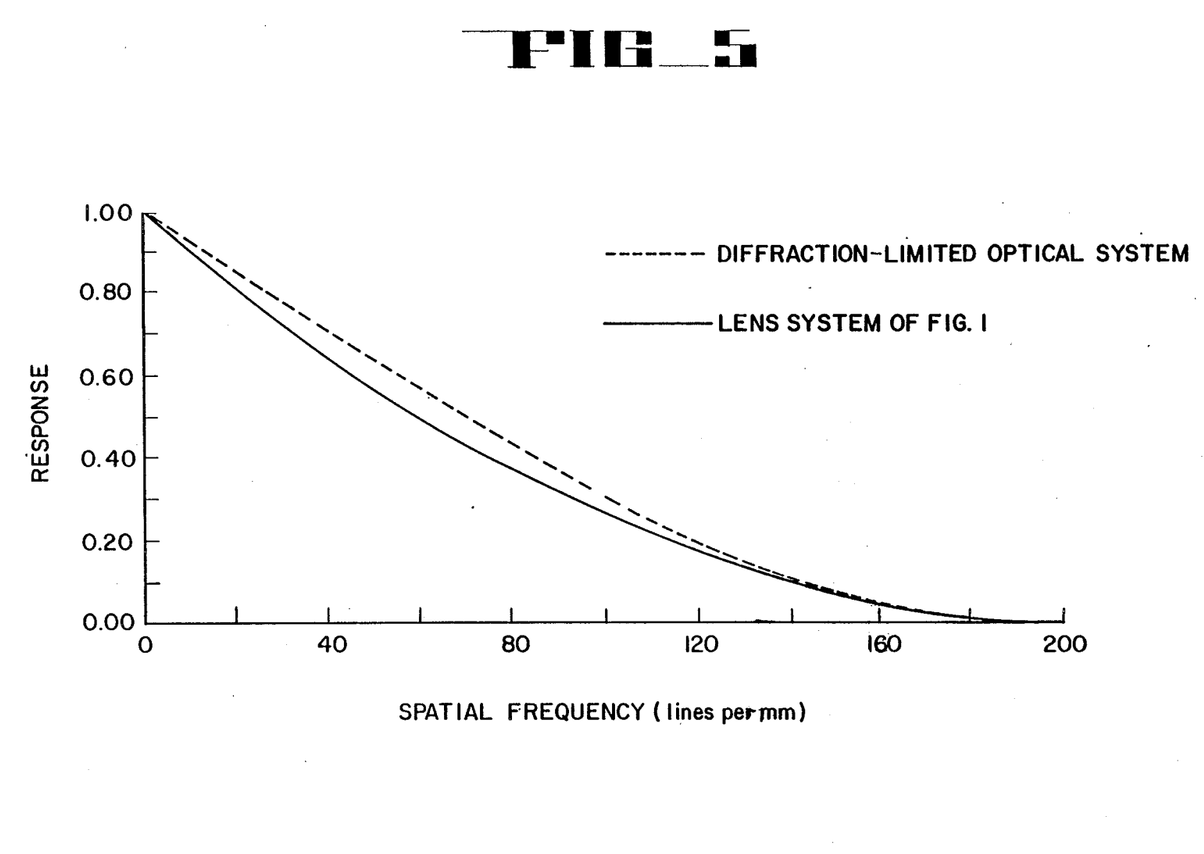
FIG. 5 is a combined plot of the polychromatic modulation transfer function for on-axis rays calculated at the wavelengths indicated in FIG. 2 for the lens triplet of FIG. 1, and of the polychromatic modulation transfer function for on-axis rays calculated at the same wavelengths for an aberration-free optical system having the same aperture diameter and focal ratio as the lens triplet of FIG. 1.

In FIG. 5, the polychromatic modulation transfer function (i.e., response versus spatial frequency) for on-axis rays calculated at the five wavelengths listed in Table II is plotted as a solid-line curve for the lens triplet of FIG. 1. Also shown in FIG. 5 is from a plot on the same scale of the polychromatic modulation transfer function for on-axis rays calculated at the same five wavelengths for an aberration-free optical system having the same aperture diameter and focal ratio as the lens triplet of FIG. 1. The plot of the polychromatic modulation transfer function for on-axis rays for the aberration-free optical system is shown as a broken-line curve in FIG. 5. The separation between the two curves in FIG. 5 indicates that the lens triplet of FIG. 1 is diffraction limited.

Figures 6, 7:
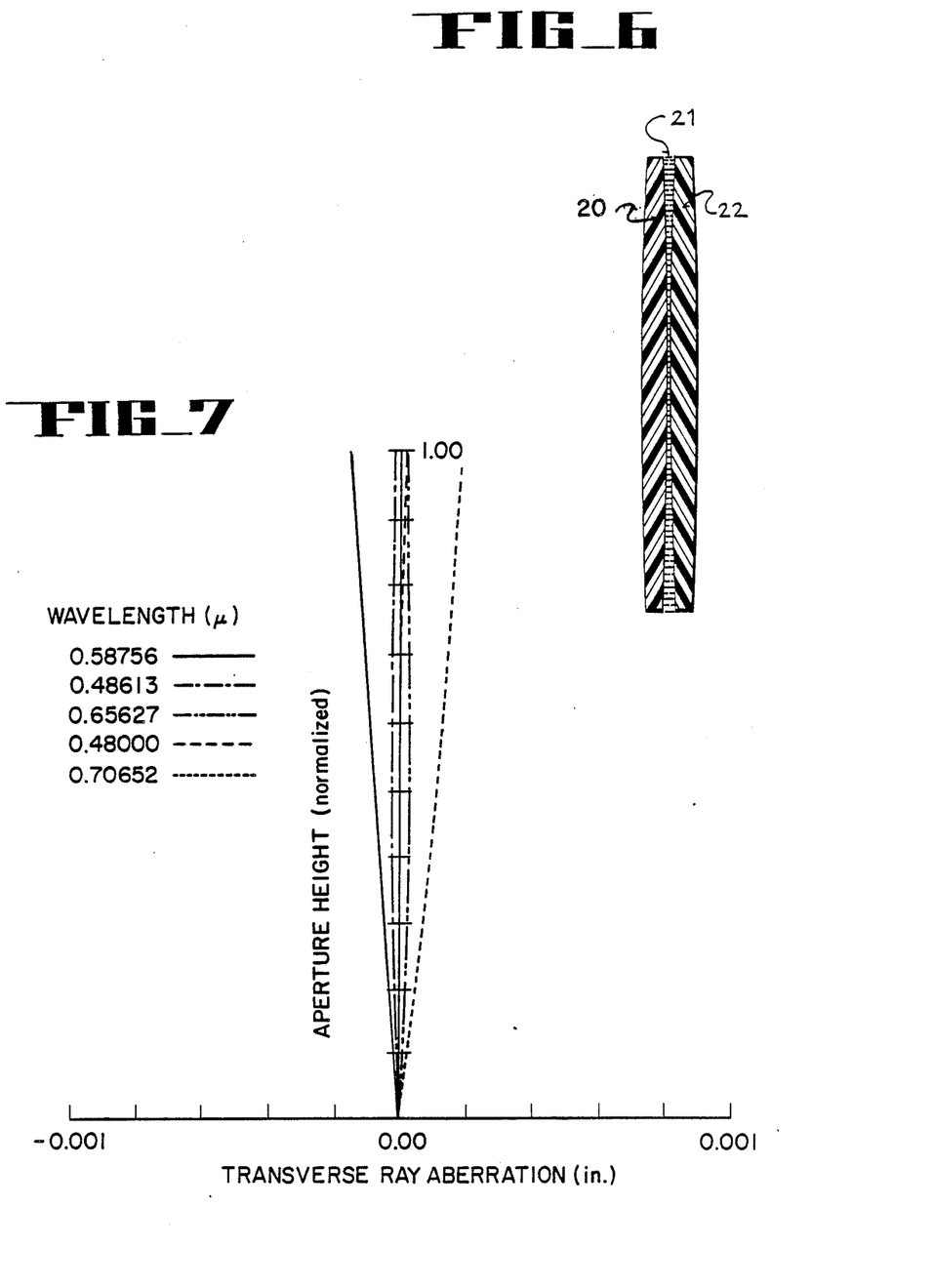
FIG. 6 is a profile drawing of a second embodiment of a lens triplet according to the present invention.
FIG. 7 is a plot of transverse ray aberration versus aperture height at five different wavelengths for the lens triplet of FIG. 6.

A second embodiment of a lens system according to the present invention, as illustrated in FIG. 6, is a triplet comprising an acrylic lens element 20, a liquid lens element 21, and an acrylic lens element 22, which are disposed coaxially with respect to each other along an optic axis, and which are secured in an appropriate mounting device for use as, e.g., a photographic objective. The optical prescription for the lens triplet shown in FIG. 6 is specified in tabular format for a 10-inch focal length and an f/10 focal ratio as follows:

TABLE IV

| Surface No. | Radius (inches) | Thickness (inches) | $N_d$ | $V_d$ | Material |
|---|---|---|---|---|---|
| 1 | 9.56232 | 0.06000 | 1.49176 | 57.46 | acrylic |
| 2 | −6.31703 | 0.00142 | 1.50012 | 35.31 | 499352 |
| 3 | 6.31703 | 0.06000 | 1.49176 | 57.46 | acrylic |
| 4 | −9.56232 | 9.96198 | | | |
| 5 | (image plane) | | | | | where the surfaces of the lens elements are numbered consecutively from left to right along the optic axis; and where the "radius", "thickness", "$N_d$", "$V_d$" and "material" for each of the lens surfaces are listed in accordance with the convention explained above in connection Table I. The diameter of each lens element is one inch, and the aperture stop for the system is located at surface No. 1. The inwardly facing surfaces No. 2 and No. 3 are spherical. However, the outwardly facing surfaces No. 1 and No. 4 are aspherical. Specifically, the configuration of each of the outwardly facing surfaces No. 1 and No. 4 is hyperboloidal with a conic constant of approximately −3.04.

The Cargille liquid listed in Table IV is identified by the code designation "499352", which uniquely specifies the particular liquid in terms of its index of refraction at the wavelength of the sodium D line. However, the values for refractive index listed in Table IV for the Cargille 499352 liquid as well as for acrylic are the values at the wavelength of the sodium d line.

The shape of each of the hyperboloidal surfaces No. 1 and No. 4 is completely specified by equation (1), where the values specified in Table IV for the curvature C, and the value specified for the conic constant k, reduce equation (1) to the form:

$$z = C[\rho^2 + 4.162\, z^2]/2. \quad (5)$$

The values of refractive index for the optical materials comprising the lens triplet of FIG. 6 at the same five wavelengths used to evaluate the performance of the lens triplet of FIG. 1 are given in tabular format as follows:

TABLE V

| Material | $N_1$ | $N_2$ | $N_3$ | $N_4$ | $N_5$ |
|---|---|---|---|---|---|
| acrylic | 1.49176 | 1.49776 | 1.48920 | 1.49826 | 1.48778 |
| 499352 | 1.50012 | 1.51015 | 1.49599 | 1.51098 | 1.49374 | where $N_1$ is the refractive index at the base wavelength of 0.58756 micron, and $N_2$, $N_3$, $N_4$ and $N_5$ are the refractive indices at specified wavelengths on either side of the base wavelength. Thus, $N_2$ is the refractive index at 0.48613 micron, $N_3$ is the refractive index at 0.65627 micron, $N_4$ is the refractive index at 0.48000 micron and $N_5$ is the refractive index at 0.70652 micron.

In FIG. 7, a plot of transverse ray aberration versus aperture height for the lens triplet of FIG. 6 is given for each of the five wavelengths indicated in Table V. From the shapes of the five plots shown in FIG. 7, it is apparent that spherical aberration is corrected, and that performance is limited by paraxial color correction.

Figure 8:
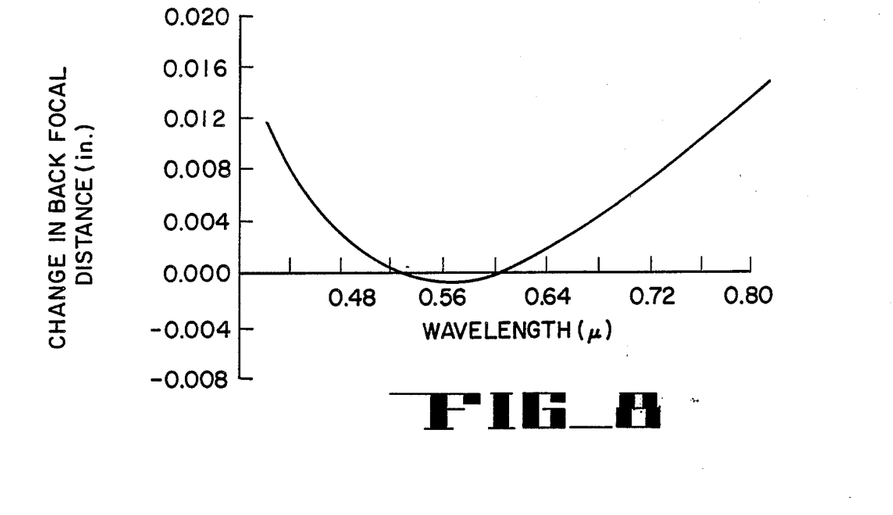
FIG. 8 is a plot of change in back focal distance versus wavelength for the lens triplet of FIG. 6.

FIG. 8 is a plot of change in back focal distance versus wavelength for the lens triplet shown in FIG. 6. As indicated by the two crossings of the horizontal axis by the curve shown in FIG. 8, the lens triplet of FIG. 6 is achromatic. Compared with the lens triplet of FIG. 1, the lens triplet of FIG. 8 has significantly reduced secondary and higher-order chromatic aberration throughout the visible spectrum.

Figure 9:
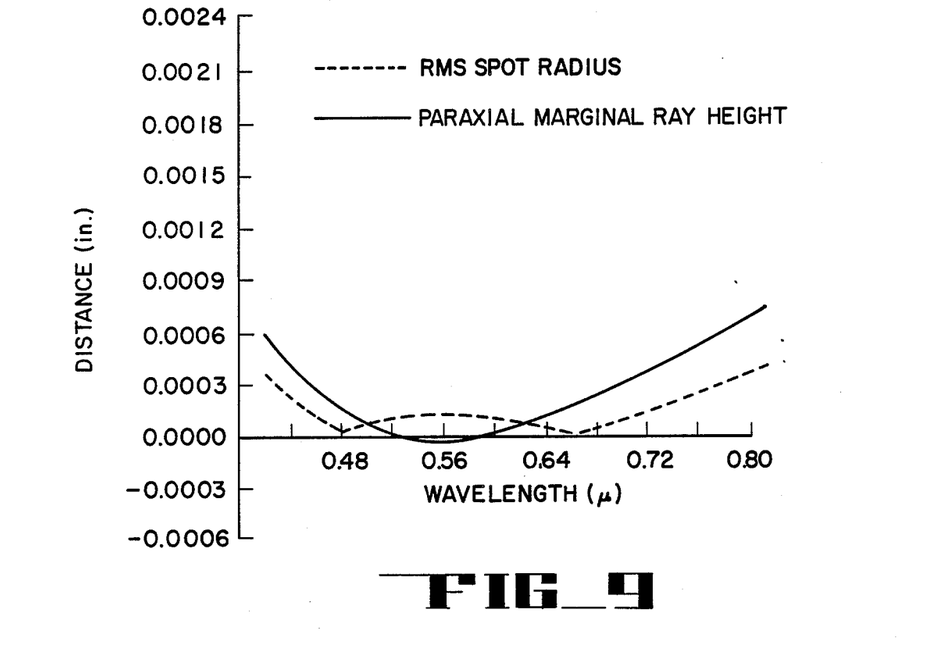
FIG. 9 is a combined plot of paraxial marginal ray height versus wavelength and root-mean-square (rms) spot radius versus wavelength for the lens triplet of FIG. 6.

In FIG. 9, paraxial marginal ray height and rms spot radius are plotted as functions of wavelength at the image plane for the lens triplet of FIG. 6. The curve for paraxial marginal ray height versus wavelength in FIG. 9 is seen to have the same shape as the curve for change in back focal distance versus wavelength shown in FIG. 8. The curve for rms spot radius versus wavelength in FIG. 9 indicates that the rms spot radius is practically constant over the wavelength range from 0.44 micron to 0.76 micron. A detailed analysis indicates that spherical aberration and the chromatic variation of spherical aberration, combined with the chromatic variation of focal position, produce a variation of rms spot radius with respect to wavelength that is less than about 25% of the mean rms spot radius over that wavelength range for the lens triplet of FIG. 6.

In FIG. 10, the polychromatic modulation transfer function for on-axis rays calculated at the five wavelengths listed in Table V is plotted as a solid-line curve for the lens triplet of FIG. 6. Also shown in FIG. 10 is a plot on the same scale of the polychromatic modulation transfer function for on-axis rays calculated at the same five wavelengths for an aberration-free optical system having the same aperture diameter and focal ratio as the lens triplet of FIG. 6. The plot for the aberration-free optical system is shown as a broken-line curve in FIG. 10. The separation between the two curves in FIG. 10 indicates that the lens triplet of FIG. 6 is diffraction limited.

Figure 11:
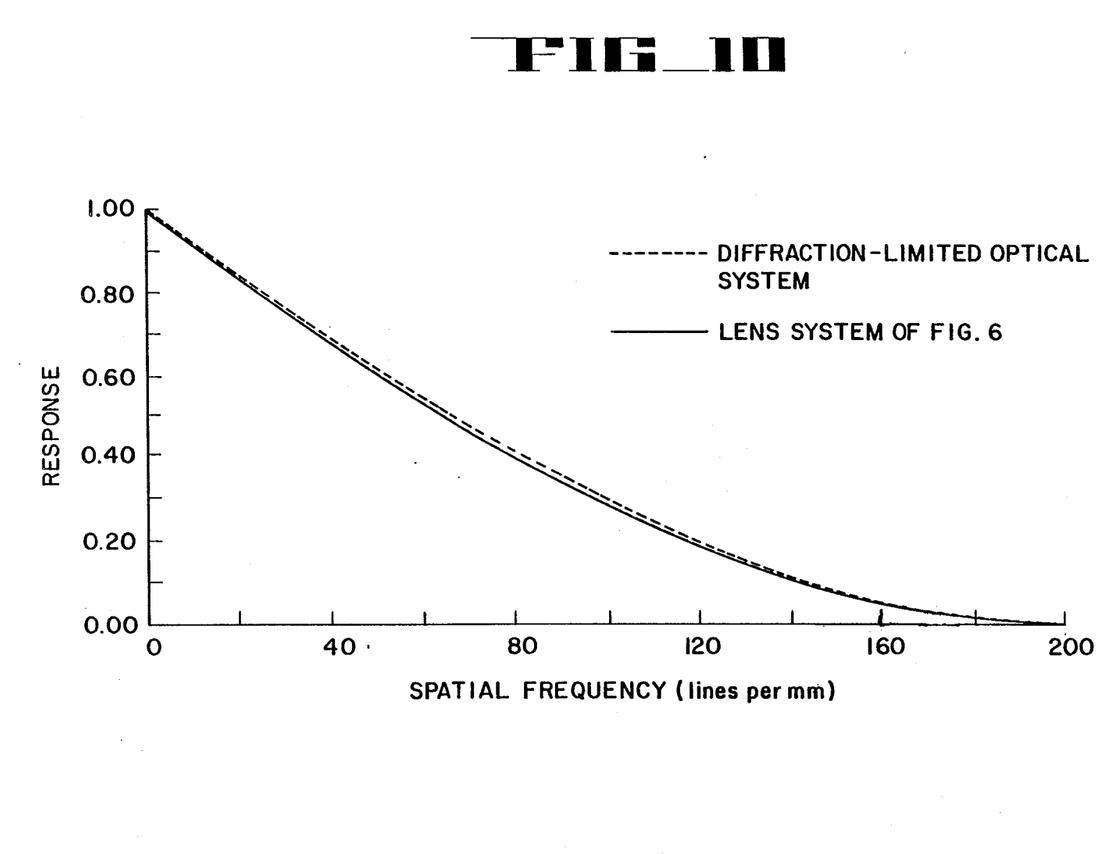
FIG. 11 is a profile drawing of a third embodiment of a lens triplet according to the present invention.

A third embodiment of a lens system according to the present invention, as illustrated in FIG. 11, is a triplet comprising an acrylic lens element 30, a liquid lens element 31, and an acrylic lens element 32, which are disposed coaxially with respect to each other along an optic axis, and which are secured in an appropriate mounting device for use as, e.g., a photographic objective. The optical prescription for the lens triplet of FIG. 11 is specified in tabular format for a 10-inch focal length and an f/10 focal ratio as follows:

TABLE VI

| Surface No. | Radius (inches) | Thickness (inches) | $N_d$ | $V_d$ | Material |
|---|---|---|---|---|---|
| 1 | 10.79058 | 0.06000 | 1.49176 | 57.46 | acrylic |
| 2 | −4.77990 | 0.00142 | 1.47011 | 38.08 | 470380 |
| 3 | 4.77990 | 0.06000 | 1.49176 | 57.46 | acrylic |
| 4 | −10.79058 | 9.95944 | | | |
| 5 | (image plane) | | | | | where the surfaces of the lens elements are numbered consecutively from left to right along the optic axis; and where the "radius", "thickness", "$N_d$", "$V_d$" and "material" for each of the lens surfaces are listed in accordance with the convention explained above in connection with Table I. The diameter of each lens element is one inch, and the aperture stop for the system is located at surface No. 1. The inwardly facing surfaces No. 2 and No. 3 are spherical. However, the outwardly facing surfaces No. 1 and No. 4 are aspherical. Specifically, the configuration of each of the outwardly facing surfaces No. 1 and No. 4 is hyperboloidal with a conic constant of approximately −4.36.

The Cargille liquid listed in Table VI is identified by the code designation "470380", which uniquely specifies the particular liquid in terms of its index of refraction at the wavelength of the sodium D line. However, the values of refractive index listed in Table VI for the Cargille 470380 liquid as well as for acrylic are the values at the wavelength of the sodium d line.

The shape of each of the hyperboloidal surfaces No. 1 and No. 4 is completely specified by equation (1), where the values specified in Table VI for the curvature C, and the value specified for the conic constant k, reduce equation (1) to the form $$Z = C[\rho^2 + 11.290\, z^2]/2. \quad (6)$$

The values of refractive index for the optical materials comprising the lens triplet of FIG. 11 at the same five wavelengths used to evaluate the performance of the lens triplets of FIGS. 1 and 6 are as follows:

TABLE VII

| Material | Index of Refraction | | | | |
|---|---|---|---|---|---|
| | $N_1$ | $N_2$ | $N_3$ | $N_4$ | $N_5$ |
| acrylic | 1.49176 | 1.49776 | 1.48920 | 1.49826 | 1.48778 |
| 470380 | 1.47011 | 1.47877 | 1.46643 | 1.47949 | 1.46440 | where $N_1$ is the refractive index at the base wavelength of 0.58756 micron, and $N_2$, $N_3$, $N_4$ and $N_5$ are the refractive indices at 0.48613 micron, 0.65627 micron, 0.48000 micron and 0.70652 micron, respectively.

Figures 11, 12:
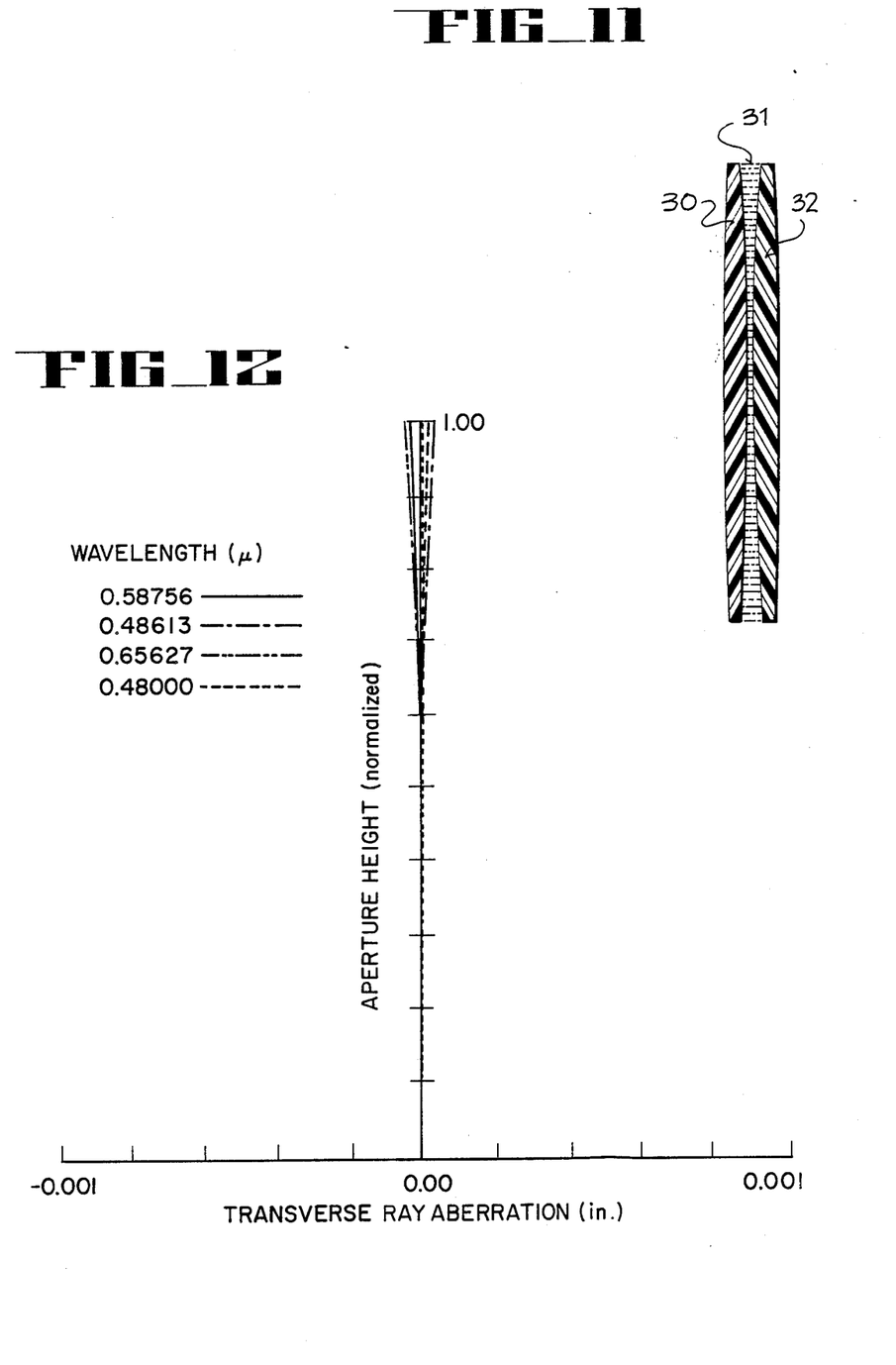
FIG. 12 is a plot of transverse ray aberration versus aperture height at five different wavelengths for the lens triplet of FIG. 11.

In FIG. 12, plots of transverse ray aberration versus aperture height are given for the five wavelengths indicated in Table VII. However, over the wavelength range from 0.48 micron to 0.80 micron, the separation between the curves for transverse ray aberration versus aperture height for discrete wavelengths is so small that the curves can barely be distinguished from one another in the scale of FIG. 11. From the shape of the curves in FIG. 12, it is apparent that performance of the lens triplet of FIG. 11 is limited by a very small residual spherochromatism.

Figure 13:
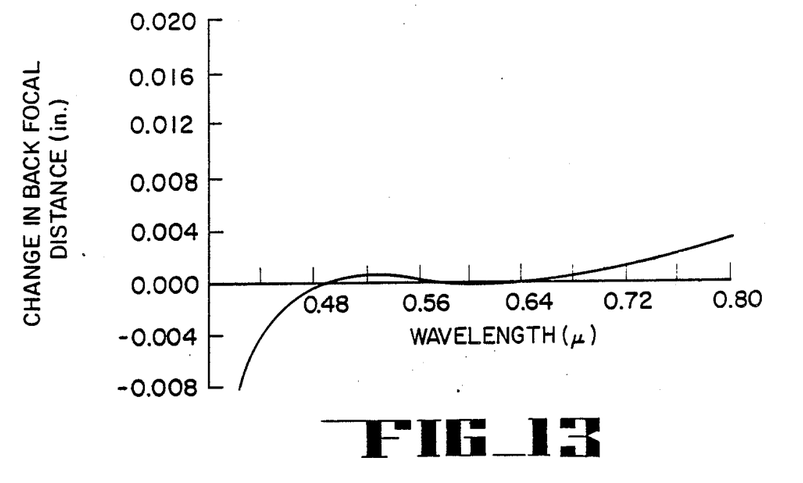
FIG. 13 is a plot of change in back focal distance versus wavelength for the lens triplet of FIG. 11.

FIG. 13 is a plot of change in back focal distance versus wavelength for the lens triplet of FIG. 11. As indicated by the three crossings of the horizontal axis by the curve in FIG. 13, the lens triplet of FIG. 11 is apochromatic and has practically insignificant secondary and higher-order chromatic aberration throughout the wavelength range from 0.44 micron to 0.80 micron.

Figure 14:
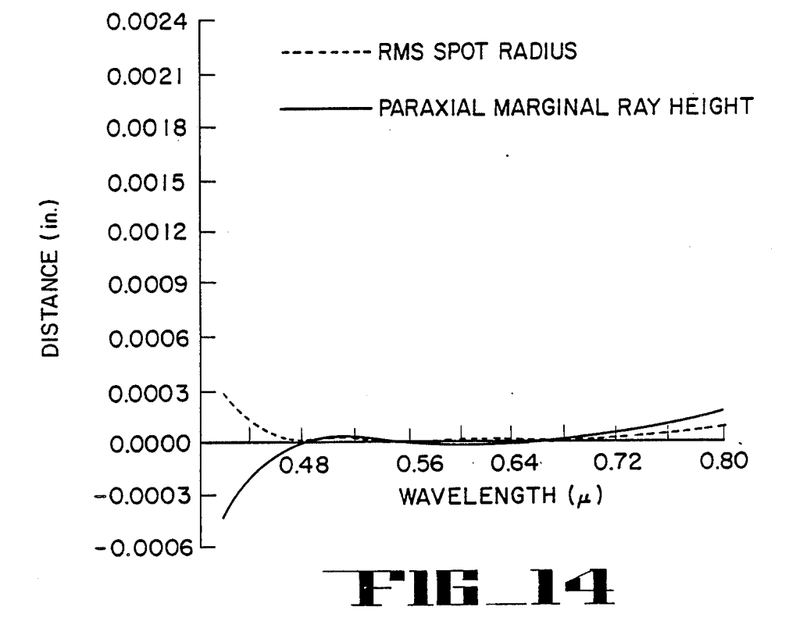
FIG. 14 is a combined plot of paraxial marginal ray height versus wavelength and root-mean-square (rms) spot radius versus wavelength for the lens triplet of FIG. 11.

In FIG. 14, paraxial marginal ray height and rms spot radius are plotted as functions of wavelength at the image plane for the apochromatic lens triplet of FIG. 11. The curve in FIG. 14 for paraxial marginal ray height versus wavelength, which has the same shape as the curve in FIG. 13 for change in back focal distance versus wavelength, indicates that geometrical blur for the lens triplet of FIG. 11 is practically insignificant over the entire visible spectrum.

The curve for rms spot radius versus wavelength in FIG. 14 indicates that the rms spot radius for the lens triplet of FIG. 11 is substantially constant over the wavelength range from 0.44 micron to 0.80 micron. The rms spot radius is approximately twice the radius of the Airy disc for the lens triplet of FIG. 11 at a wavelength of 0.46 micron, and is substantially equal to the radius of the Airy disc at the 0.80 micron wavelength. Thus, the lens triplet of FIG. 11 is diffraction-limited at wavelengths of 0.80 micron and longer.

Figure 15:
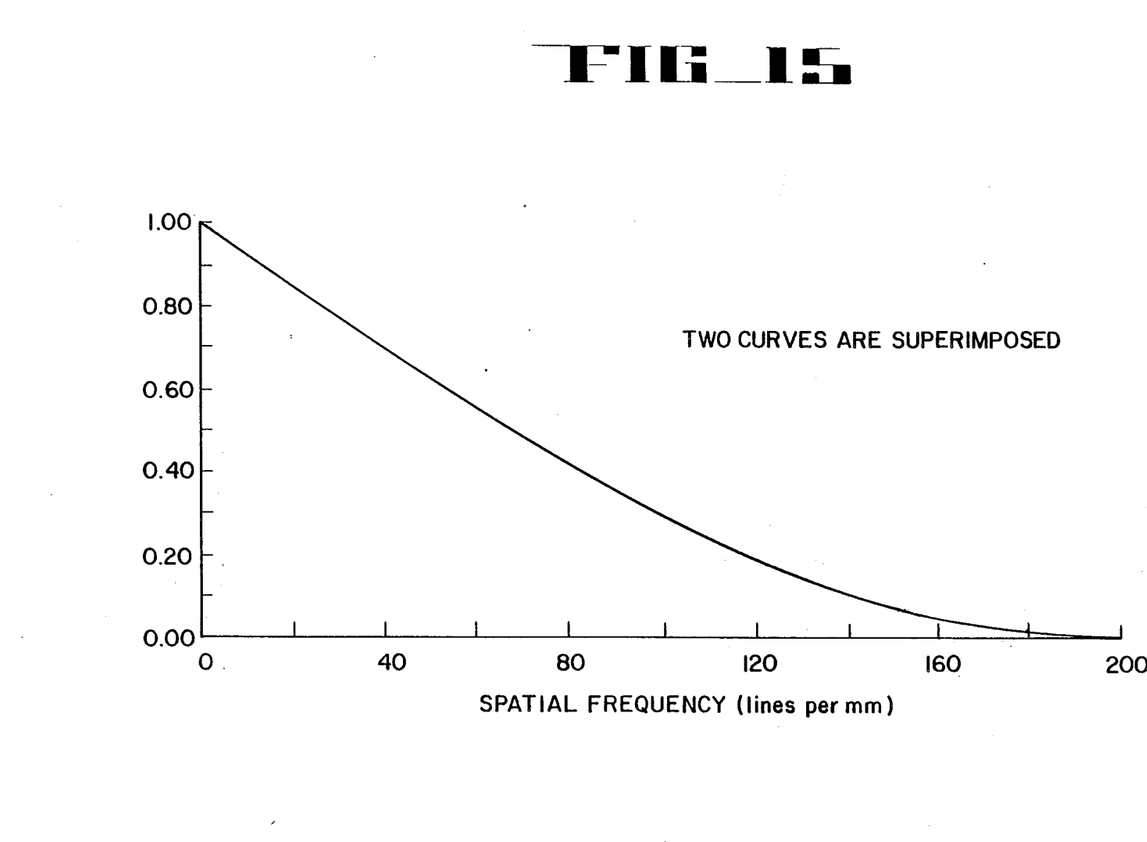
FIG. 15 is a combined plot of the polychromatic modulation transfer function for on-axis rays calculated at the wavelengths indicated in FIG. 12 for the lens triplet of FIG. 11, and of the polychromatic modulation transfer function for on-axis rays calculated at the same wavelengths for an aberration-free optical system having the same aperture diameter and focal ratio as the lens triplet of FIG. 11.

In FIG. 15, the solid-line curve represents a plot of the polychromatic modulation transfer function for on-axis rays calculated at the five wavelengths listed in Table VII for the lens system of FIG. 11, and also a plot of the polychromatic modulation transfer function for on-axis rays calculated at the same five wavelengths for an aberration-free optical system having the same aperture diameter and focal ratio. The fact that the two plots appear as a single curve in FIG. 15 indicates that the wavefront error for lens system of FIG. 11 is so small as to be substantially identical to the wavefront error for a "perfect" lens system over the spectral range of Table VII.

The present invention has been described above in terms of particular embodiments. However, other embodiments within the scope of the present invention would become apparent to practitioners skilled in the art of optical design upon perusal of the foregoing specification and accompanying drawing. Accordingly, the present foregoing invention is defined more generally by the following claims and their equivalents.

I claim:

1. An apochromatic lens system comprising two plastic lens elements and a liquid lens element disposed coaxially along an optic axis, said two plastic lens elements being substantially identical to each other, a surface on each of said two plastic lens elements being aspherical.

2. The lens system of claim 1 wherein said two plastic lens elements and said liquid lens element further coact with each other to focus optical radiation passing through said lens system with a change in focus of less than one-quarter wavelength over said wavelength range between said two discrete wavelengths.

3. The lens system of claim 1 wherein said two plastic lens elements and said liquid lens element further coact with each other to focus optical radiation passing through said lens system at a third wavelength in said wavelength range between said two discrete wavelengths onto said common focal surface.

4. The lens system of claim 1 wherein said two plastic lens elements are made of acrylic.

5. The lens system of claim 4 wherein said liquid lens element is made of an optical liquid having an index of refraction of approximately 1.71035 at a wavelength of 0.58756 micron and an Abbe number of approximately 20.95.

6. The lens system of claim 4 wherein said liquid lens element is made of an optical liquid having an index of refraction of approximately 1.50012 at a wavelength of 0.58756 micron and an Abbe number of approximately 35.31.

7. The lens system of claim 4 wherein said liquid lens element is made of an optical liquid having an index of refraction of approximately 1.47011 at a wavelength of 0.58756 micron and an Abbe number of approximately 38.08.

8. The lens system of claim 1 wherein said plastic lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 8.36233 | 0.06000 | 1.49176 | 57.46 | acrylic |
| 2 | −25.10491 | 0.00142 | 1.71035 | 20.95 | 710209 |
| 3 | 25.10491 | 0.06000 | 1.49176 | 57.46 | acrylic |
| 4 | −8.36233 | 9.96452 | | | |
| 5 | (image plane) | | | | | where $N_d$ is the index of refraction at the wavelength of the sodium d spectral line and $V_d$ is the Abbe number at the same wavelength, and where surfaces No. 2 and No. 3 are spherical, and surfaces No. 1 and No. 4 are hyperboloidal with a conic constant of approximately −2.47.

9. The lens system of claim 1 wherein said plastic lens elements and said liquid lens element are configured and positioned along said optic axis substantially according to an optical prescription as follows:

TABLE I

| Surface No. | Radius (inches) | Thickness (inches) | $N_d$ | $V_d$ | Material |
|---|---|---|---|---|---|
| 1 | 9.56232 | 0.06000 | 1.49176 | 57.46 | acrylic |
| 2 | −6.31703 | 0.00142 | 1.50012 | 35.31 | 499352 |
| 3 | 6.31703 | 0.06000 | 1.49176 | 57.46 | acrylic |
| 4 | −9.56232 | 9.96198 | | | |
| 5 | (image plane) | | | | | where $N_d$ is the index of refraction at the wavelength of the sodium d spectral line and $V_d$ is the Abbe number at the same wavelength, and where surfaces No. 2 and No. 3 are spherical, and surfaces No. 1 and No. 4 are hyperboloidal with a conic constant of approximately −3.04.

10. The lens system of claim 1 wherein said plastic lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 10.79058 | 0.06000 | 1.49176 | 57.46 | acrylic |
| 2 | −4.77990 | 0.00142 | 1.47011 | 38.08 | 470380 |
| 3 | 4.77990 | 0.06000 | 1.49176 | 57.46 | acrylic |
| 4 | −10.79058 | 9.95944 | | | |
| 5 | (image plane) | | | | | where $N_d$ is the index of refraction at the wavelength of the sodium d spectral line and $V_d$ is the Abbe number at the same wavelength, and where surfaces No. 2 and No. 3 are spherical, and surfaces No. 1 and No. 4 are hyperboloidal with a conic constant of approximately −4.36.

11. A lens system comprising two acrylic lens elements and a liquid lens element disposed coaxially along an optic axis, said two acrylic lens elements being substantially identical to each other, a surface on each of said two acrylic lens elements being aspherical, said two acrylic lens elements and said liquid lens element coacting with each other to focus optical radiation at two discrete wavelengths passing through said lens system onto a common focal surface, said liquid lens element being made of an optical liquid having an index of refraction of approximately 1.71035 at a wavelength of 0.58756 micron and an Abbe number of approximately 20.95.

12. A lens system comprising two acrylic lens elements and a liquid lens element disposed coaxially along an optic axis, said two acrylic lens elements being substantially identical to each other, a surface on each of said two acrylic lens elements being aspherical, said two acrylic lens elements and said liquid lens element coacting with each other to focus optical radiation at two discrete wavelengths passing through said lens system onto a common focal surface, said liquid lens element being made of an optical liquid having an index of refraction of approximately 1.50012 at a wavelength of 0.58756 micron and an Abbe number of approximately 35.31.

* * * * *